(12) United States Patent
Delaney et al.

(10) Patent No.: US 6,795,546 B2
(45) Date of Patent: Sep. 21, 2004

(54) METHODS AND SYSTEMS FOR DISTRIBUTING SIGNALING MESSAGES AMONG MULTIPLE PROCESSORS FOR STATEFUL AND/OR SEQUENCED PROCESSING OF THE MESSAGES ON A PER-SEQUENCE BASIS

(75) Inventors: Robert J. Delaney, Raleigh, NC (US); John L. Hildebrand, Hillsborough, NC (US); Peter J. Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 40 days.

(21) Appl. No.: 10/294,400

(22) Filed: Nov. 14, 2002

(65) Prior Publication Data

US 2004/0096049 A1 May 20, 2004

(51) Int. Cl.[7] .............................................. H04M 7/00
(52) U.S. Cl. ........................................ 379/229; 379/230
(58) Field of Search .................................. 379/229, 230, 379/221.08, 221.1; 370/522, 524, 134

(56) References Cited

U.S. PATENT DOCUMENTS

| | | | |
|---|---|---|---|
| 5,650,998 A | * 7/1997 | Angenot et al. | ............ 370/225 |
| 6,396,840 B1 | * 5/2002 | Rose et al. | ................. 370/401 |
| 6,434,155 B1 | 8/2002 | Jones et al. | ................. 370/398 |
| 2002/0048360 A1 | 4/2002 | Zambre et al. | ............ 379/229 |

\* cited by examiner

*Primary Examiner*—Ahmad F. Matar
*Assistant Examiner*—Quynh H. Nguyen
(74) *Attorney, Agent, or Firm*—Jenkins, Wilson & Taylor, P.A.

(57) ABSTRACT

Methods and systems for distributing signaling messages among multiple processors for stateful processing and/or sequenced processing of the messages on a per sequence basis are disclosed. A signaling message is received and it is determined whether the signaling message requires stateful and/or sequenced processing. If the signaling message requires stateful and/or sequenced processing, a sequence identifier is computed for the signaling message. The sequence identifier is unique on a per sequence basis. The sequence identifier is then used to distribute the signaling message to an application processor for stateful and/or sequenced processing.

41 Claims, 11 Drawing Sheets

US 6,795,546 B2

METHODS AND SYSTEMS FOR DISTRIBUTING SIGNALING MESSAGES AMONG MULTIPLE PROCESSORS FOR STATEFUL AND/OR SEQUENCED PROCESSING OF THE MESSAGES ON A PER-SEQUENCE BASIS

TECHNICAL FIELD

The present invention relates generally to the distribution and processing of messages in a communications network. More particularly, the present invention relates to methods and systems for distributing messages among multiple processors for stateful or sequenced processing of the messages on a per-sequence basis.

BACKGROUND ART

Within a signaling system 7 (SS7) communication network call setup and teardown information is conveyed using ISDN user part (ISUP) messages. Typically, all ISUP messages associated with the same call or "circuit" are routed along the same signaling path between the originating and terminating offices involved in the call. The routing of these ISUP messages is commonly performed by SS7 signal transfer point (STP) routing nodes that reside in the network. As signaling networks have evolved, STP nodes have increasingly been used to perform message processing functions in addition to basic message routing functionality. One example of such message processing is SS7 global title translation (GTT), which is performed on class 0 signaling connection control part (SCCP) messages transmitted through a signaling network. For SCCP messages, protocol class 0 identifies a service class characterized by connectionless service for which sequencing is not required.

FIG. 1 is a block diagram of an exemplary STP node 100 that performs internal GTT processing on SCCP messages. STP 100 employs a distributed, multi-processor architecture, which allows a number of independent processor cards to simultaneously receive and process SS7 signaling messages. More particularly, STP 100 includes an interprocessor message transport bus 102, a pair of maintenance and administration subsystem processors 104, a first SS7 link interface module (LIM) 110, a second LIM 112, a first GTT processor 120, and a second GTT processor 122. As generally indicated in FIG. 1, an SCCP message received at LIM 110 may be identified as requiring GTT processing and may be directed to GTT processor 122. GTT processor 122 performs GTT address translation on the received SCCP message and determines the routing prior to directing the message to outbound LIM 112 for transmission.

In STP 100 illustrated in FIG. 1, GTT processors 110 and 112 are identically provisioned so as to be operated in a load-sharing manner. That is, an inbound or receiving LIM module distributes received SCCP messages to a GTT processor based on the available capacity of each active GTT processor module in the system. Load-sharing among multiple redundant processors is advantageous for non-stateful processing of messages. For example, GTT processing of class 0 SCCP messages requires only that a received SCCP message be translated and routed to a final destination based on the translated address. Once the GTT processor performs an address translation and directs the SCCP message to an outbound LIM, that particular address translation is of no significance to translation operations performed on SCCP messages subsequently received by the STP. Hence, GTT processing of class 0 SCCP messages is not stateful in nature, and a relatively simple load-sharing algorithm may be employed to handle internal SCCP message distribution within a multi-processor STP. For example, class 0 SCCP message may be load-shared among GTT processors on a per-message basis using any suitable message-based distribution function.

In contrast to class 0 SCCP messaging, ISUP message processing can be both stateful and sequenced. As used herein, the term "stateful processing" refers to processing where state information must be stored by a processor in order to process messages relating to the same transaction. The term "sequenced processing" refers to processing that requires messages to be processed, sent or received in a particular sequence. FIG. 2 is a simplified call setup scenario involving a sample telecommunication network 150 that includes a calling party 152, a called party 154, an originating end office exchange 156, a tandem office exchange 158, a terminating end office exchange 160, and three STP nodes 162–166. When calling party 152 completes the dialing of digits associated with called party 154 (i.e., 851–2345), originating exchange 156 selects and reserves a voice trunk for the call. In this example, the selected voice trunk terminates at tandem exchange 158. As such, an ISUP initial address message (IAM) is generated by originating exchange 156 and transmitted via STP nodes 162 and 164 to tandem exchange 158. This IAM message includes information necessary for the intermediate tandem exchange 158 to complete the call setup operation. Upon receipt of the originating exchange generated IAM message, tandem exchange 158 secures the voice trunk to exchange 156 and subsequently reserves a voice trunk to terminating exchange 160. Tandem exchange 158 then generates an ISUP address complete (ACM) message, which is transmitted back to the originating exchange, and a second IAM message (i.e., IAM*), which is transmitted to the terminating exchange 160 in a manner similar to that described above.

Sometimes all of the dialed digits needed to initiate the call setup sequence are not transmitted in the IAM message. For example, the ITU ISUP protocol employs a subsequent address message (SAM) and a subsequent directory number message (SDM) to carry additional called party (CdPA) information in addition to that provided in an IAM message. A detailed description of the ITU ISUP protocol may be found in ITU publications Q.761 *Signaling System No. 7-ISDN User Part Functional Description*, 12/1999 and Q.762 Signaling System No. 7-ISDN User Part General Functions Of Messages And Signals, 12/1999, the disclosures of which are herein incorporated by reference in their entirety.

FIG. 3 illustrates sample telecommunications network 150 and a portion of the ITU ISUP signaling involved in a call setup operation. In this signaling example, an IAM message is transmitted by the originating exchange 156 after the calling party 152 has dialed a sufficient number of digits (e.g., calling party dials "851") to enable the exchange 156 to determine which voice trunk to select. The remaining dialed digit information necessary to complete the call setup is communicated to the tandem office 158 via one (or more) SAM messages, as indicated in FIG. 3.

The scenario described above and illustrated in FIG. 3 is an example of a signaling scenario that presents significant problems for stateful and/or sequenced processing of the messages. Unlike the GTT processing of class 0 SCCP messages, where all of the information necessary to process a received message is present in that message, an ISUP processing application may require that multiple, related messages (e.g., IAM, SAM, SDM messages) be collected and analyzed before stateful and/or sequenced processing can be successfully completed. For example, commonly assigned co-pending U.S. Patent Publication No. US 2002/0054674 (hereinafter, the '674 Publication), the disclosure of which is incorporated herein by reference in its entirety, discloses methods and systems for providing triggerless intelligent network screening services based on stateful and sequenced processing of call setup messages. In one embodiment of the invention disclosed in the '674 Publication, a triggerless screening service routing node, such as an STP, screens call setup messages, such as ISUP messages, and provides intelligent network services. Examples of intelligent network services provided include calling party screening, called party screening, charged party screening, and redirecting party screening. Each of these applications may utilize dialed digits collected from call setup messages to make a screening decision. If the dialed digits are sent in multiple messages, processing of the multiple messages may be stateful because processors may remember the state of a call in order to determine the message to be expected next. For example, after receiving an IAM message with partial dialed digits, a processor may enter a state, such as "waiting for SAM." Such processing may also be sequenced in that IAM and SAM messages must be received, processed, and transmitted in order. Thus, in order to ensure such stateful and sequenced processing, it is necessary that these call setup messages be processed by the same processor or that call setup information from one processor be forwarded to another processor. Distributing the call state among processors is undesirable because such distribution information consumes processor cycles and inter-processor bandwidth.

One message distribution approach that has been previously deployed in some distributed processing systems involves distributing messages among processors in a round-robin manner. In round-robin message distribution, messages are distributed sequentially among processors. When the last processor is reached, distribution starts again with the first processor and the algorithm repeats. While such a distribution technique may provide uniform distribution of messages across multiple application processors, this approach requires communication of state information between processors for stateful or sequenced processing, such as any of the ISUP screening processing operations described in the '674 Publication, to be performed. This type of "constant cross-talk" architecture is complex, inefficient and wasteful of communication module processing and internal communication bus bandwidth resources.

Accordingly, there exists a long-felt need for improved methods and systems for distributing signaling messages among multiple processors for stateful or sequenced processing.

DISCLOSURE OF THE INVENTION

The present invention includes a signal transfer point with multiple application processors for sharing the stateful or sequenced processing of messages, such as ISUP messages or class 1, 2, or 3 SCCP messages. The signal transfer point computes a sequence identifier that is unique to a given sequence of messages. The sequence identifier is used to distribute a particular message to an application processor. Because messages in the same sequence will have the same sequence identifier, messages relating to the same sequence will be distributed to the same application processor. As a result, the exchange of messages or state information between application processors is not needed. Thus, by performing distribution on a per-sequence basis, rather than a per-message basis, the present invention is more efficient than conventional message distribution algorithms.

A stateful application screening and sequencing function, which may be resident in the STP, computes the sequence identifier for each received message identified as requiring stateful or sequenced message processing. For ISUP messages, the stateful application screening and sequencing function may use the circuit identification code (CIC) and originating point code (OPC) values in received messages to compute the sequence identifier. For class 1 SCCP messages, the stateful application screening and sequencing function may use the signaling link selection (SLS) and OPC values in each received message to compute the sequence identifier.

Accordingly, it is an object of the present invention to provide methods and systems for distributing messages among multiple processors so that stateful and/or sequenced processing of the messages can be shared on a per-sequence basis.

It is another object of the invention to provide methods and systems for distributing messages among multiple processors that allow stateful and/or sequenced processing of the messages on a per-sequence basis without requiring communication of state information between processors.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
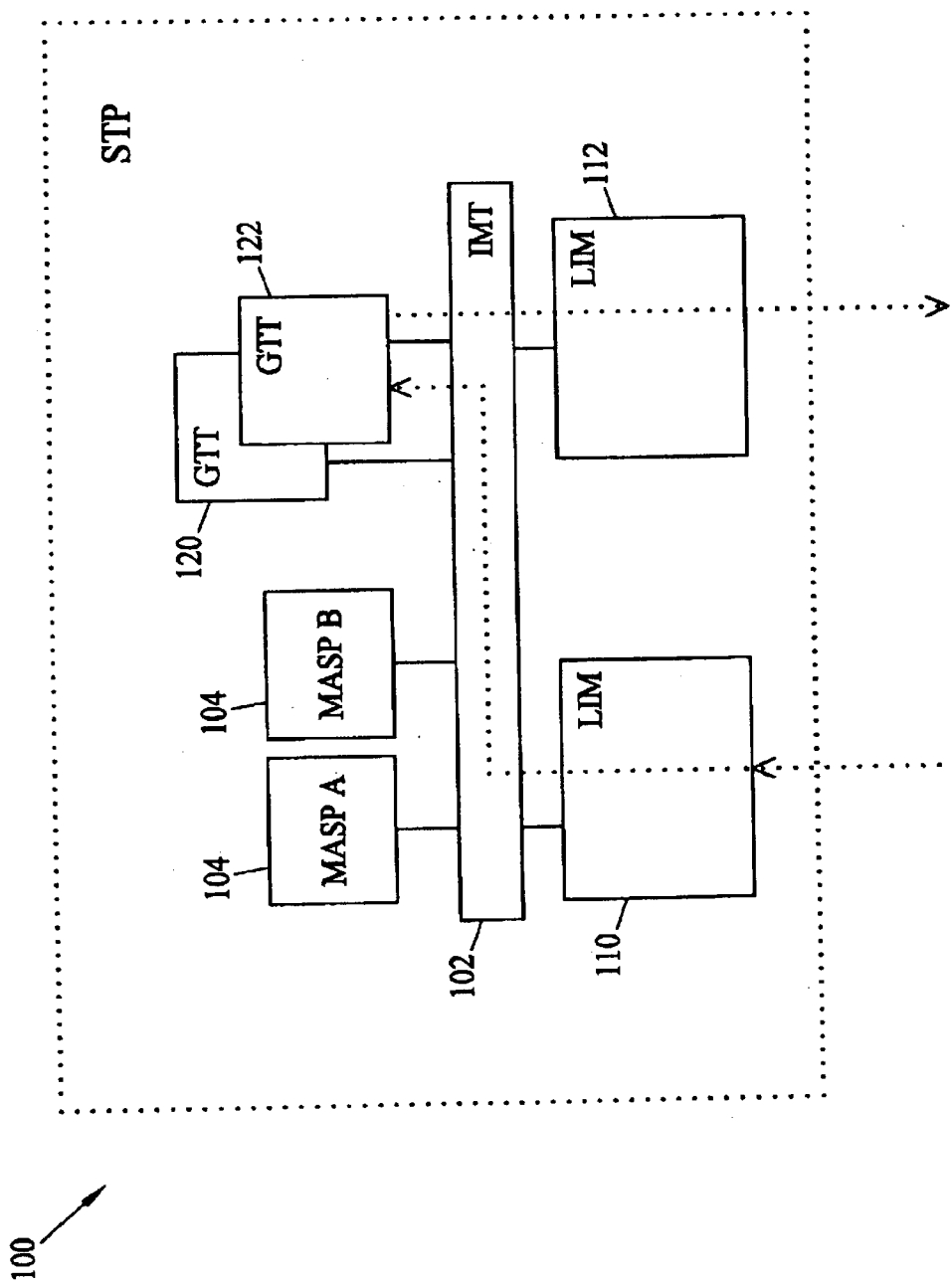
FIG. 1 is a block diagram of a conventional signal transfer point (STP) configured to load share stateless processing of class 0 signaling connection control part (SCCP) messages.
Figure 2:
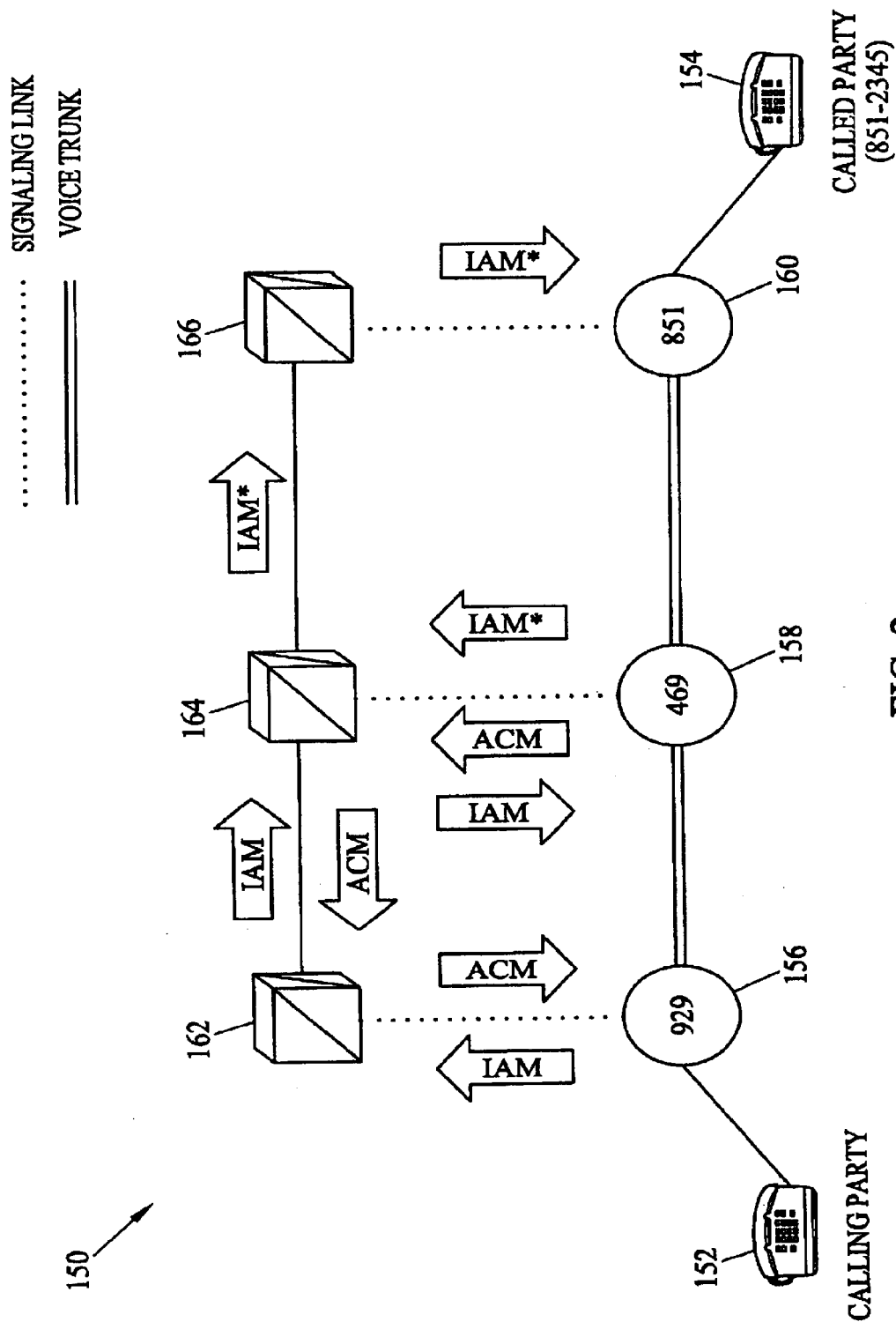
FIG. 2 is a network diagram illustrating an ISDN user part (ISUP) call setup signaling message flow associated with a call setup attempt.
Figure 3:
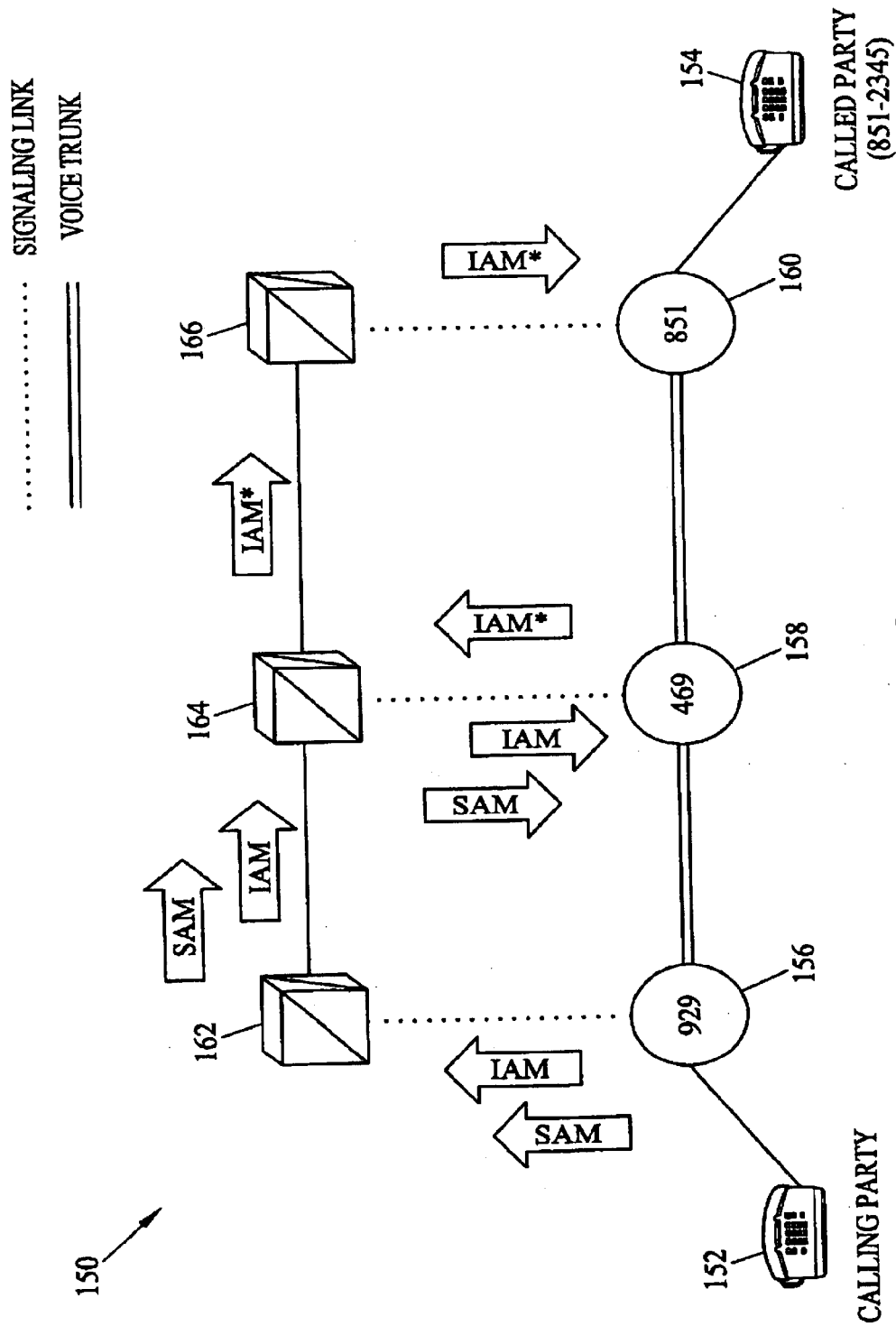
FIG. 3 is a network diagram illustrating an ISUP call setup signaling message flow, which includes a subsequent address message (SAM)
Figure 4:
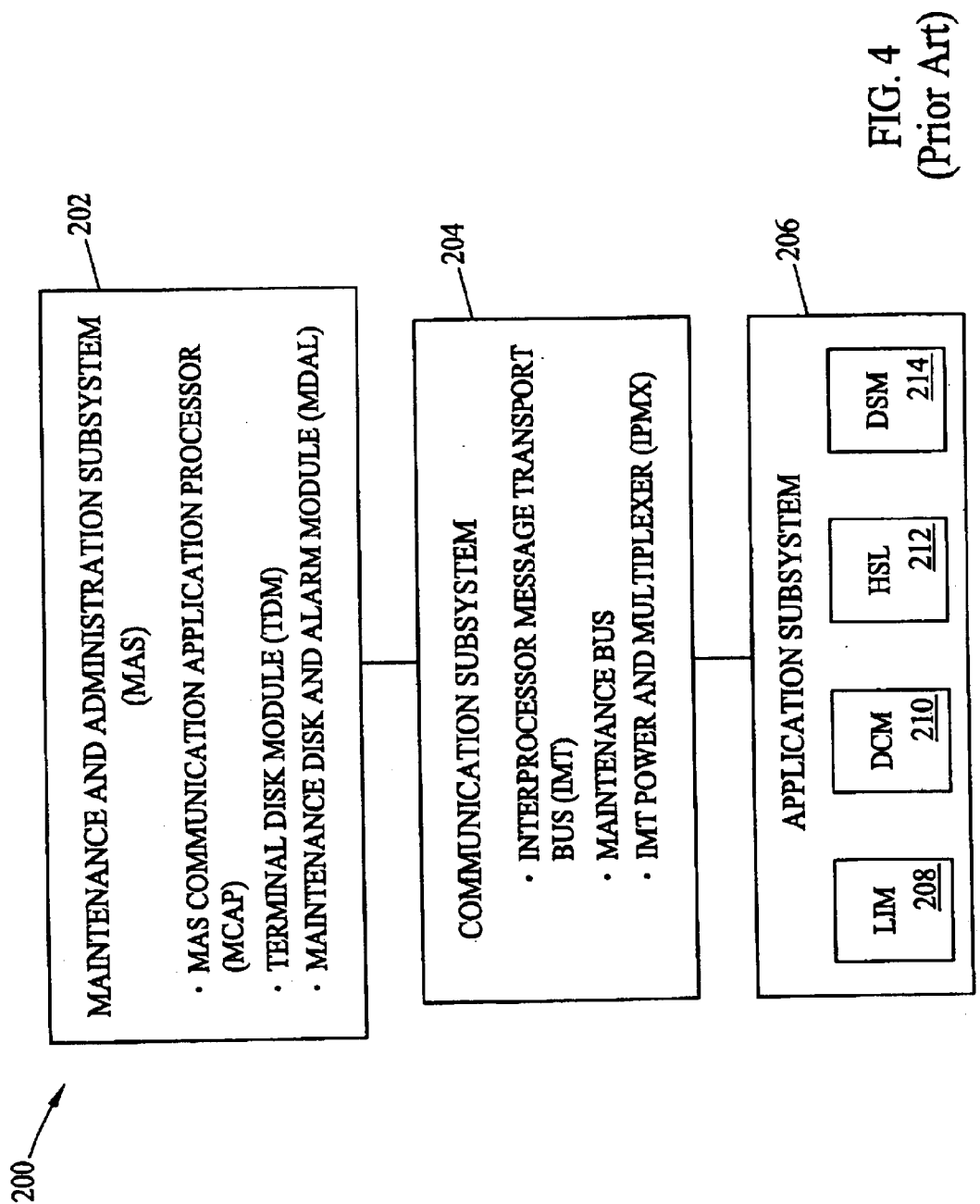
FIG. 4 is a is a block diagram illustrating an exemplary internal architecture of a signal transfer point (STP) routing node suitable for use with embodiments of the present invention.

According to one embodiment, the present invention includes a communications network routing node, such as a signaling system 7 (SS7) signal transfer point (STP), configured to distribute signaling messages among multiple processors so that stateful or sequenced processing of the signaling messages can be shared among the processors on a per-sequence basis. FIG. 4 is a block diagram illustrating an exemplary STP node 200 suitable for use with embodiments of the present invention. STP 200 is described herein as a collection of modules and functions. It is understood that these modules and functions may be implemented in software residing in memory and executed by one or more general-purpose microprocessors. Alternatively, the modules and functions described herein may be implemented in hardware, such as application-specific integrated circuits (ASICs) or programmable logic modules. Any combination of hardware, software, and firmware for distributing messages among multiple processors for stateful and/or sequenced on a per-sequence basis as described herein is intended to be within the scope of the invention.

As shown in FIG. 4, STP 200 includes the following subsystems: a maintenance and administration subsystem (MAS) 202, a communication subsystem 204 and an application subsystem 206. MAS 202 provides maintenance communications, initial program loading, peripheral services, alarm processing and system disks. Communication subsystem 204 includes an interprocessor message transport (IMT) bus that is the main communication bus among subsystems in STP 200. The IMT bus may include 1 Gbps counter-rotating serial buses.

Application subsystem 206 includes application cards or printed circuit boards capable of communicating with the other cards through the IMT bus. Numerous types of application cards can be included in STP 200. Exemplary application cards that may be included in STP 200 include a link interface module (LIM) 208 that provides SS7 links and X.25 links, a data communication module (DCM) 210 that provides an Internet protocol (IP) signaling interface to external nodes, and a high-speed asynchronous transfer mode (ATM) communication link module (HSL) 212. One or more database service modules (DSM) 214 may also be included for stateful and stateless processing of signaling messages.

Exemplary Internal Architecture of an STP Routing Node

Figure 5:
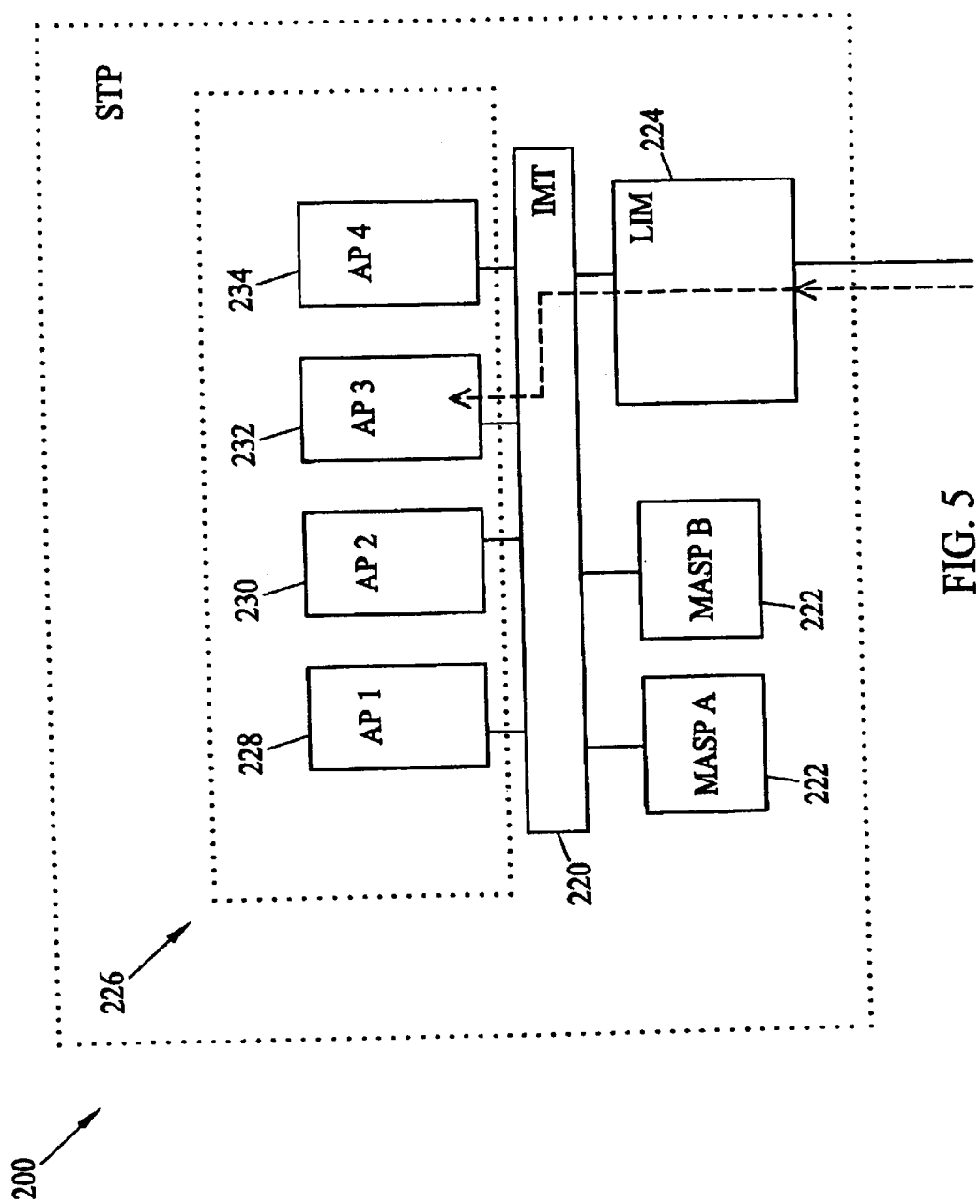
FIG. 5 is a block diagram illustrating an exemplary internal architecture of an STP node including a stateful application screening and sequencing module according to an embodiment of the present invention.

FIG. 5 illustrates an exemplary internal architecture of an STP including a stateful application screening and sequencing module according to an embodiment of the present invention. In FIG. 5, STP node 200 includes a high-speed IMT communications bus 220. A number of distributed processing modules or cards are coupled to IMT bus 220, including: a pair of maintenance and administration subsystem processors 222, an SS7-capable link interface module 224, and an application subsystem 226 that includes a first application processor 228, a second application processor 230, a third application processor 232, and a fourth application processor 234. Application processors 228, 230, 232, and 234 may include any stateful and/or sequenced message processing applications, such as the ISUP screening applications described in the '674 Publication referenced above.

The modules and application processors illustrated in FIG. 5 may be physically connected to IMT bus 220 such that signaling and other types of messages may be routed internally between active cards or modules. In one embodiment, application processors 228, 230, 232, and 234 may be DSM modules physically connected to IMT bus 220. In an alternate embodiment of the present invention, application processors 228, 230, 232, and 234 may be external computing platforms, such as Tekelec TekServer™ platforms, which may be directly coupled to IMT bus 220 or indirectly coupled to IMT bus 220 via Ethernet interface modules (not shown in FIG. 5).

For simplicity of illustration, only a single LIM 224 is illustrated in FIG. 5. However, the distributed processing architecture of STP 200 enables multiple LIM, DSM, TekServer™ and other processing modules to be simultaneously coupled to IMT bus 220. Furthermore, although only one application processor group is illustrated in FIG. 5, multiple application processor groups or subsystems may be included in STP node 200 without departing from the scope of the invention.

Figure 6:
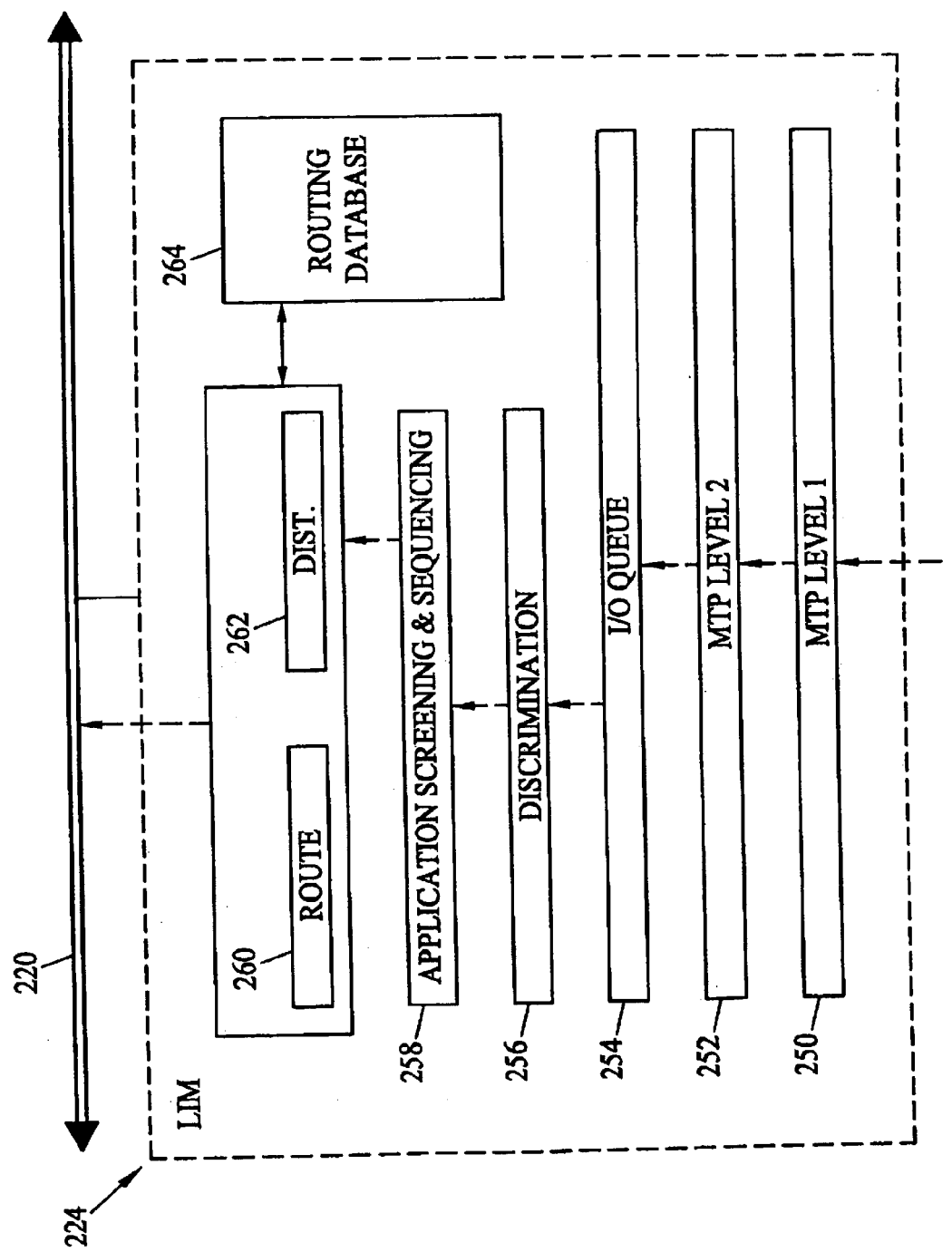
FIG. 6 is a block diagram illustrating a signaling system 7 (SS7) communication module associated with an STP according to an embodiment of the present invention.

FIG. 6 illustrates an exemplary internal architecture for a link interface module according to an embodiment of the present invention. Referring to FIG. 6, LIM 224 includes a number of functions including an SS7 MTP level 1 function 250, an MTP level 2 function 252, an I/O buffer 254, an SS7 MTP level 3 message handling and discrimination (HMDC) function 256, an application screening and sequencing function 258, a message routing function 260, a message handling and distribution (HMDT) function 262, and a routing information database 264. MTP level 1 function 250 sends and receives digital data over a particular physical interface. MTP level 2 function 252 provides error detection, error correction, and sequenced delivery of SS7 message packets. I/O buffer 254 provides temporary buffering of incoming and outgoing signaling message packets.

HMDC function 256 receives an incoming signaling message from the lower processing layers and determines whether the message is addressed to and consequently requires processing by one or more application subsystems in STP node 200. Stateful application screening and sequencing function 258 is responsible for examining an incoming signaling message, which may not be addressed to STP node 200 and determining whether the message requires stateful and/or sequenced processing by an application subsystem in STP node 200. Stateful application screening and sequencing function 258 also generates a sequencing value for each message identified as requiring stateful and/or sequenced processing. The sequencing value is preferably unique on a per-sequence basis. The sequencing value, along with the identified target application subsystem, determines the application processor module in the application subsystem to which the message should be distributed. Because the sequencing values are unique on a per-sequence basis, messages in the same sequence are distributed to the same processor. As a result, processing of the messages can be shared among multiple processors without requiring the communication of state information between processors.

In one embodiment, stateful application screening and sequencing function 258 examines the message transfer part (MTP) origination point code (OPC), destination point code (DPC), and service indicator octet (SIO) parameter values in a received call setup signaling message (e.g., ISUP IAM message) to determine the need for stateful processing by an application subsystem.

Stateful Sequencing and Message Distribution Algorithms

In the event that a signaling message is identified as requiring stateful and/or sequenced processing by an application subsystem, stateful application screening and sequencing function 258 applies a sequencing algorithm that uses information contained in the message to generate the sequencing value. For a received ISUP message, the sequencing algorithm may use the CIC and OPC values from the messages to generate the sequencing value. For class 1, class 2, or class 3 SCCP messages, the sequencing algorithm may use the SLS and OPC values from the message to generate the sequencing value.

The message distribution algorithms of the present invention achieve superior performance when compared to round-robin message distribution. In round-robin message distribution, messages are distributed sequentially among processors on a per-message basis. Round-robin message distribution techniques ensure that messages are distributed equally to all active application processors in a system or service group regardless of the content of the messages. However, round-robin message distribution does not ensure that messages in the same sequence will be distributed to the same processor. Thus, using such round-robin distribution techniques when messages require stateful or sequenced processing means that a dynamic message distribution mapping must be constructed by each communication module and that this message distribution mapping information be continuously shared among all communications modules in the system. For example, for the scenario in which a message requiring stateful or sequenced processing is received by a communication module, before a first communication module that receives the message from the network can distribute the message to an application processor in the system, the communication module must determine if the message is the first message in a sequence of messages requiring stateful or sequenced processing. If another message associated with the sequence has already been received and distributed to a particular controlling application processor in the system, then the received message must be distributed to that same controlling application processor.

Since there is no guarantee in round-robin message distribution that all messages related to the same messaging sequence will be received by the same communication module, each communication module must share its current distribution mapping information the other communication modules so that all messages associated with the same messaging sequence can be distributed to the same application processor. In even a relatively small distributed processing system, the processing overhead and bandwidth costs of maintaining real-time synchronization among a number of communication modules can be significant.

The improved message sequencing and distribution methods according to the present invention provide guaranteed distribution of sequenced messages to the appropriate application processor without requiring the extensive processing overhead and bandwidth costs described above with respect to the round-robin approach. Once again, the present invention involves the use of a stateful message sequencing and distribution algorithm, which does not require the exchange of dynamic message distribution mapping information among communication modules in the system. Instead, stateful application screening and sequencing function 258 applies a stateful sequencing algorithm that uses information contained in a message to generate a sequence identifier value used to select the appropriate controlling application processor to which the message is distributed. Because the sequence identifier is the same for all messages in a sequence, messages in the same sequence will be automatically delivered to the same application processor. In addition, because different sequences of messages will sometimes have different sequence identifiers, the stateful or sequenced processing of messages can be shared on a per sequence basis.

An exemplary stateful message distribution algorithm that utilizes the sequence identifier will now be described in detail. In the illustrated example, the stateful message distribution algorithm includes a normal condition component and a failure condition component. The normal condition component may be used first, regardless of the condition of the application processors. The failure condition component may be used when the normal condition component selects an unavailable application processor.

Normal Condition Component Equation $$\text{Offset value} = v - E * (\lfloor v/E \rfloor) \quad (1)$$

Where, v is the sequence identifier computed for a message;

E is the number of equipped processors associated with a particular application or service; and $\lfloor \ \rfloor$ is the round down operator.

Failure Condition Component Equation $$\text{Offset value} = A - ((( \lfloor v/E \rfloor) * F + N) - (A * (\lfloor (\lfloor v/E \rfloor * F + N)/A \rfloor))) \quad (2)$$

Where, v is the sequence identifier computed for a message;

A is the number of available processors associated with a particular application or service;

E is the number of equipped processors associated with a particular application or service;

F is the number of failed processors associated with a particular application or service;

N is the failure order of application processors determined via 0, 1, 2, 3. ($1^{st}$ to fail, $2^{nd}$, etc . . . ); and $\lfloor \ \rfloor$ is the round down operator.

As the naming convention would suggest, the failure condition component of the algorithm is used only in cases where one or more application processors in the system have failed. Otherwise, only the normal condition component is employed. In both exemplary algorithm components, evaluated fractions are rounded down to the nearest integer. For a received ISUP message, the value sequence identifier (v) may be calculated as the sum of the CIC code value and the OPC value. For a class 1, class 2, and class 3 SCCP messages, the sequence identifier (v) may be calculated as the sum of the SLS value and the OPC value.

The present invention is not limited to using the CIC, OPC, and SLS values to compute sequence identifiers. Any suitable values from a received message that can be used to compute a value that is the same for each message in a sequence and that is unique on per-sequence basis is intended to be within the scope of the invention. For example, for a sequence of session initiation protocol (SIP) messages, the sequence identifier may be determined using the Call_ID, the Call_Sequence (Cseq), the Session_ID, the To, and the From parameters contained in each message. For H.225 signaling messages, the Call_Reference_Value parameter may be used in determining the sequence identifier. In some cases, lower level protocol parameters may be used to determine the sequence identifier. For example, in the stream control transmission protocol (SCTP), an SCTP association identifier and/or stream identifier may be used to determine the sequence identifier. In a transmission control protocol (TCP) environment, an IP address and a TCP port may be used to determine the sequence identifier.

An application processor sequence table, shown below in Table 1, may be accessible by stateful application screening and sequencing function 258 to determine the number of available processors for use in Equations (1) and (2). Table 1 includes an application group field, an application processor identifier field, and a processor status field. The application group field is used to distinguish groups of processors that are supporting different applications (e.g., prepaid calling service). A unique processor identifier is assigned to each application processor within a given application group. The information in this table is used in conjunction with the stateful distribution algorithm to determine the controlling application processor for a message in a given messaging sequence, as described below.

TABLE 1

Application Processor Sequence And Status

| Application Group | Processor ID | Status |
|---|---|---|
| Prepaid | A | Available |
| Prepaid | B | Available |
| Prepaid | C | Available |
| Prepaid | D | Available |

Message Distribution Operation

Figure 7:
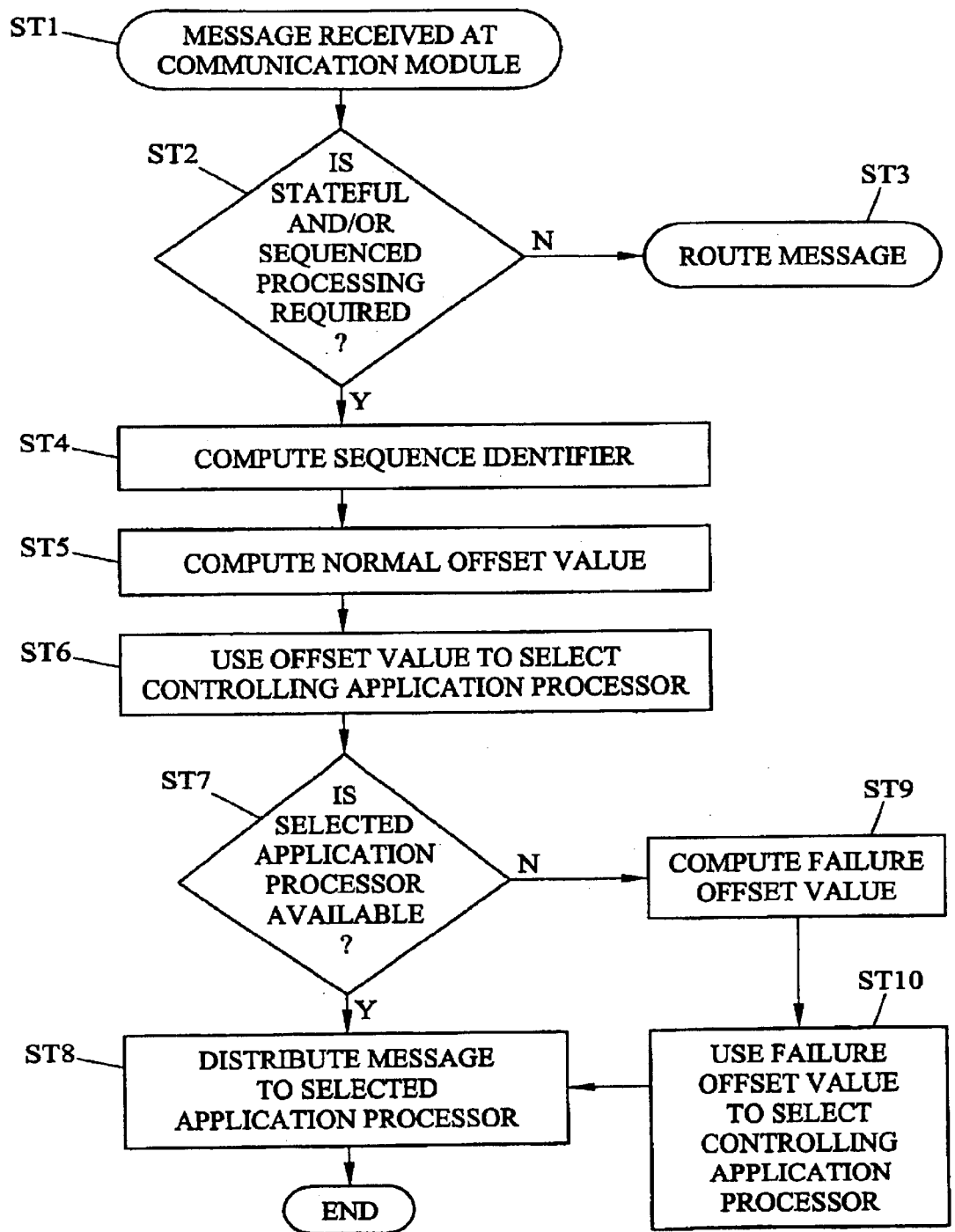
FIG. 7 is a flow chart illustrating exemplary message distribution processing that may be performed within a signal transfer point according to an embodiment of the present invention.

FIG. 7 is a flow chart illustrating exemplary steps that may be performed by stateful application screening and sequencing function 258 and message distribution function 262 in distributing signaling messages among multiple processors for sequenced and/or stateful processing according to an embodiment of the present invention. Beginning with step ST1, a message is received at LIM 224 and is passed up the stack to stateful application screening and sequencing function 258. For purposes of illustration, the received message is assumed to be an ISUP message, such as an ISUP IAM message. Stateful application screening and sequencing function 258 examines parameters associated with the received message 300 and determines whether stateful and/or sequenced processing is indicated and if so, to which group of application processors the message should be distributed (ST2). Table 2 is a sample screening table which may be used or accessed by function 258 to make such a determination. Table 2 includes a number of screening keys, including a service indicator (SI) key, a DPC key, an OPC key, a CIC code key, and an SCCP subsystem (SSN) key. Associated with each compound key entry is an application group value that identifies a group of application processors for performing stateful, sequenced, and non-stateful, non-sequenced processing of received messages, depending on the message type.

TABLE 2

Sample Application Screening Criteria

| APPLICATION SCREENING KEY(s) | | | | | DATA |
|---|---|---|---|---|---|
| SI | DPC | OPC | CIC | SSN | App Group |
| 3 | 2-3-7 | * | n/a | * | GTT |
| 3 | 2-3-6 | * | n/a | 23 | GTT |
| 5 | 3-2-2 | 4-1-1 | 42 | n/a | Prepaid |
| 5 | * | 1-0-0 | * | n/a | Prepaid |

In Table 2, the entries with "GTT" in the application group field identify messages that require non-stateful, non-sequenced processing, and thus messages matching these entries would not be selected for stateful and/or sequenced processing. The entries with "prepaid" in the application group column identify messages that require prepaid call screening. Since prepaid call screening may require stateful, sequenced processing, messages matching these entries may be identified for further distribution processing by stateful application screening and sequencing function 258. Some messages require sequenced but non-stateful processing. An example of these types of messages are SCCP type 1 messages. Accordingly, stateful application screening and sequencing function 258 may identify these messages as requiring further distribution processing by stateful application screening and sequencing function 258. SCCP type 1 and type 2 messages may require both stateful processing. Accordingly, stateful application screening and sequencing function 258 may identify these messages as requiring further distribution processing by stateful application screening and sequencing function 258.

Figure 8:
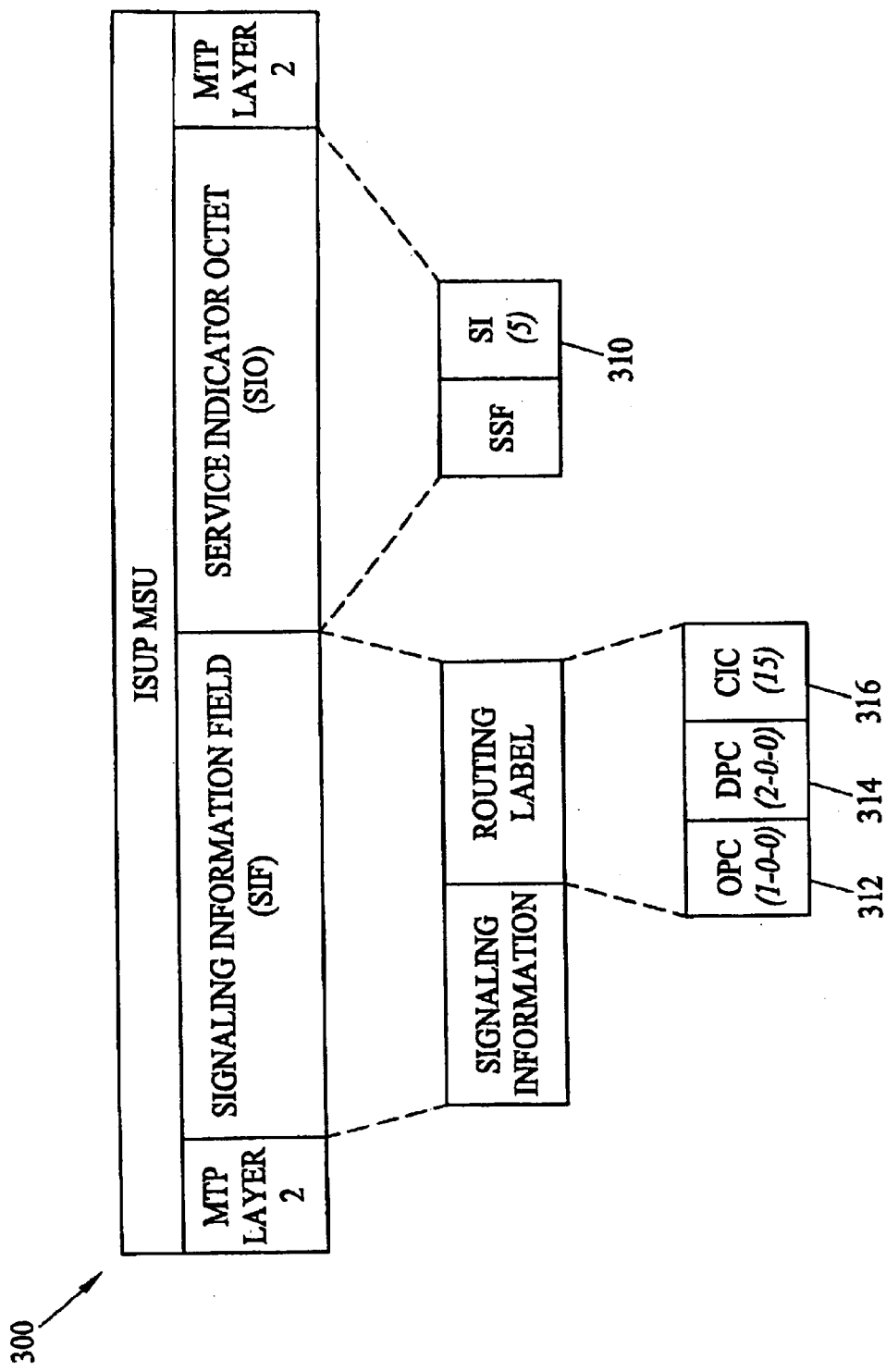
FIG. 8 is a block diagram illustrating the structure of an SS7 ISDN user part message.

In this example, since the received message is assumed to be an ISUP IAM message, stateful application screening and sequencing function may examine ISUP message parameters to determine whether stateful and/or sequenced processing is indicated. Referring to FIG. 8, an ISUP message 300 includes an SI field 310 with a value of 5 identifying the ISUP message type, an OPC field 312 with a value of 1-0-0, a DPC field 314 with a value of 2-0-0, and a CIC field 316 with a value of 15. In an ANSI compliant network, OPC and DPC values are 24 binary bits (commonly represented as 8 bits-8 bits-8 bits), while a CIC value may include up to 8 bits. Given the information contained in the received message 300, screening function 258 locates a matching entry in Table 2 (i.e., the last record), indicating that processing is required by application B. If a matching entry had not been located in Table 2, no further screening and sequencing processing need be performed by function 258, and the message could be passed along for additional screening operations or simply routed on towards a final destination (ST3).

Given that a matching entry was located in this example, the message undergoes further processing by screening function 258. More particularly, the OPC and CIC values in message 300 are extracted and mathematically combined to yield the sequence identifier (v), as described above (step ST3). In this case, the addition of the 24 bit OPC value (i.e., 00000001-00000000-00000000 binary or 65536 decimal) and the 8 bit CIC value (i.e., 00001111 binary or 15 decimal) yields a sequence identifier value of 65551 (decimal). The number of equipped or provisioned processors associated with the "prepaid" application group (i.e., 4) is then obtained from Table 1. These two values are next plugged into Equation 1 above to compute the offset value, as indicated in step ST5. Using a sequence identifier, v, of 65551 and an equipped processor count value, E, of 4 the distribution algorithm described above yields a resulting offset value of 3. In step ST6, a specific application processor is selected from the group of 4 processors using the offset value.

Figure 9:
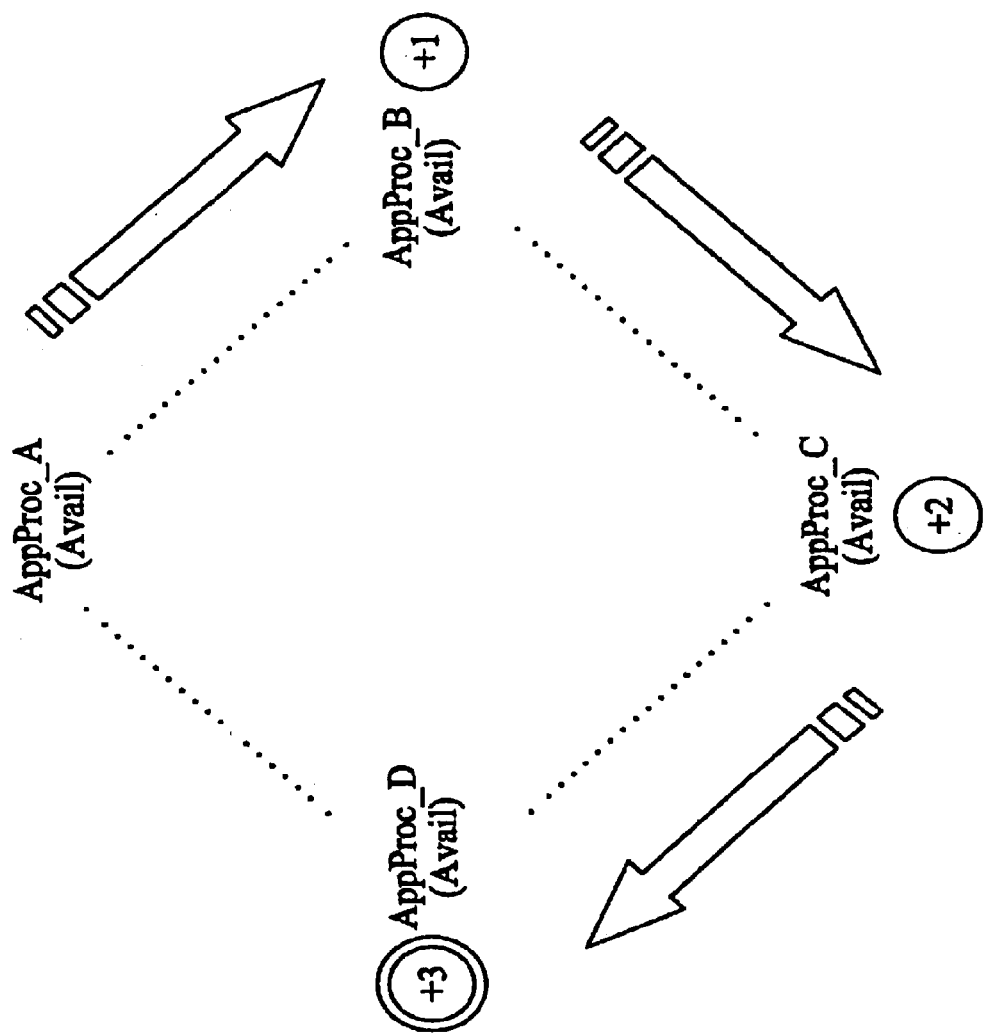
FIG. 9 is a flow diagram illustrating application processor selection using a normal distribution component of a sequence-based message distribution algorithm according to an embodiment of the present invention.

FIG. 9 graphically illustrates application processor selection based on the offset value according to an embodiment of the present invention. Referring to FIG. 9, the four application processors that make up the prepaid application processor group can be thought of as a ring of processors for distribution purposes where the specific application processor for processing a message may be selected by stepping around the ring in a number of steps equal to the offset value. In an actual implementation, the values representing each application processor in a group may be stored in sequential memory locations and the offset may be used to step among the various memory locations. In this example, the calculated offset value of 3 is used to step around the 4 application processors of the conceptual ring illustrated in FIG. 9 in a clockwise manner. In memory, each offset increment may lead to a new memory location where a new application processor identifier is stored. Once the last memory location containing an application processor identifier is reached, function 258 may return to the memory location of the first application processor identifier. As indicated in FIG. 9, beginning with application processor A, the first offset step leads to application processor B. The second offset step leads to application processor C, and the final third offset step leads to application processor D.

Returning to FIG. 6, once the application processor has been selected, its status is checked (step ST7). Since application processor D is available, the message and selected processor information is passed to distribution function 262 on LIM 224 and the message is transmitted to application processor D via IMT bus 220 (step ST8).

When an application processor is selected using the normal distribution algorithm component, stepping is performed in a clockwise manner around the ring and each application processor "node" in the ring is counted regardless of the status of each node. Only application processor status is required for stateful application screening and sequencing function 258 to select a target processor. No additional state information associated with past message distribution transactions need be maintained or accessed by function 258 in order to determine to which application processor a particular message should be distributed.

Once again, in round-robin message distribution, every LIM module in the system would be required to be made aware of where the ISUP IAM message was sent so that any subsequent, related messages (e.g., SAM or SDM messages) could be distributed to the same application processor. The present embodiment only requires that the LIMs know the status of each application processor. Ping or heartbeat messages can be used by screening and sequencing function 258 in order to maintain the application processor status information shown in Table 1. Such messages will not consume a significant portion of IMT bus bandwidth when compared to the exchange of state information.

In order to illustrate message distribution when an application processor fails, an example will now be described in which it is assumed that prepaid application processor D has failed and can no longer accept or process messages. In this example, steps ST1-ST7 are the same as those steps described above for the normal or non-failure case. For example, the offset is computed using Equation (1) described above, using v=65551 and E=4, which yields an offset value of 3. Using the application processor ring structure diagram illustrated in FIG. 9, the offset is stepped off in a clockwise manner starting from application processor A. As in the previous example, the offset results in the selection of application processor D. However, in this case, application processor D has failed and can no longer accept traffic. Consequently, as indicated in step ST9, Equation (2) is evaluated using the following input parameters; v=3, A=3, E=4, F=1, N=0, which yields a failure offset value of 3. In step ST10, the failure offset value is used to select the application processor.

Figure 10:
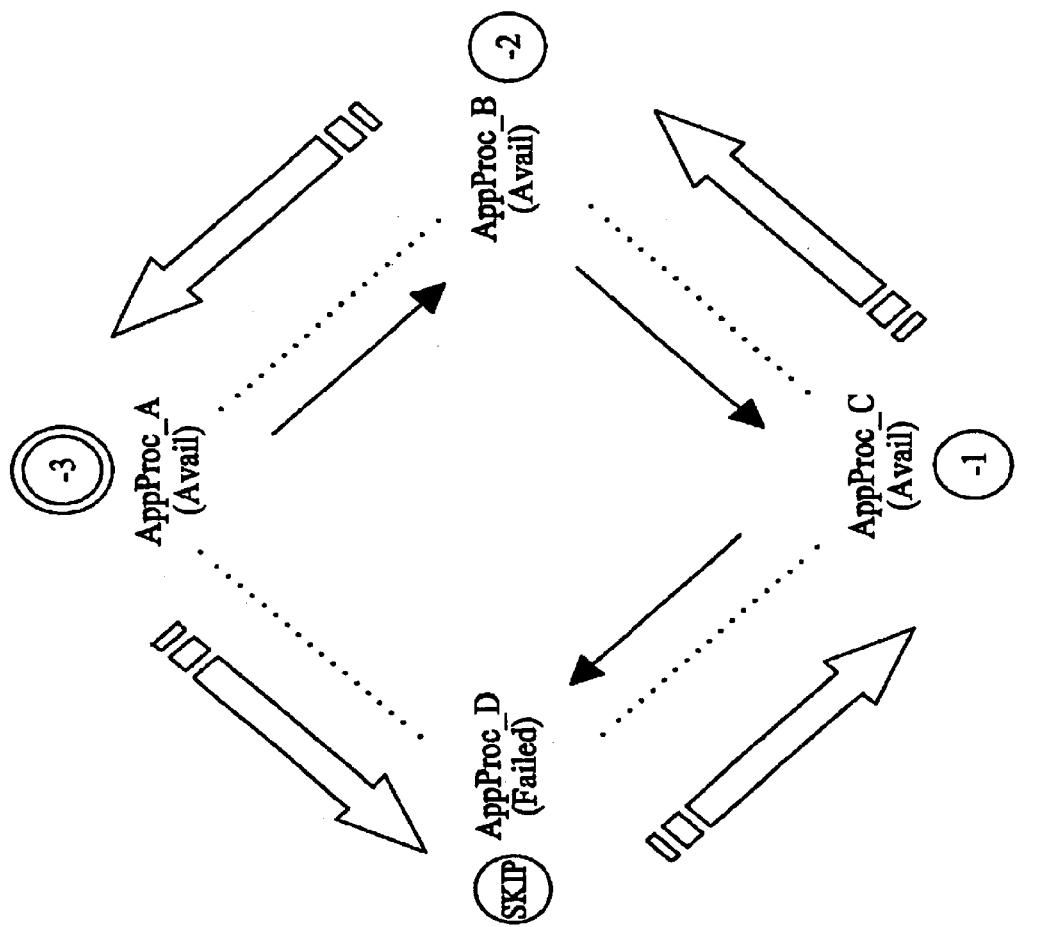
FIG. 10 is a flow diagram illustrating application processor selection using a failure distribution component of a sequence-based message distribution algorithm according to an embodiment of the present invention.

Referring to FIG. 10, the failure offset value is applied to the application processor ring diagram; however, failure offset values are stepped off in a counterclockwise manner starting from application processor A. Furthermore, when stepping off a failure offset, only available nodes in the ring are counted (i.e., failed application processor nodes are skipped). Beginning with application processor A, the first offset step leads to application processor C. Application processor D is skipped since it is unavailable. The second offset step leads to application processor B, and the final third offset step leads to application processor A. Consequently, the message and selected processor information is passed to distribution function 262 on LIM 224, and the message is transmitted to application processor A via IMT bus 220, as indicated by step ST8 in FIG. 7.

Certain applications may only require a copy of some or all of the received message contents, and in such instances the original received message may simply be copied and then routed from the system without being distributed to an application processor. The message copy may be distributed to the appropriate processor using the stateful message distribution and sequencing algorithms described above. In other applications, such as call screening applications, the actual signaling message may be distributed to the appropriate application processor using the algorithms described above before being allowed to pass to the intended destination. Distributing both message copies and original messages using the algorithms described above is intended to be within the scope of the invention.

Figure 11:
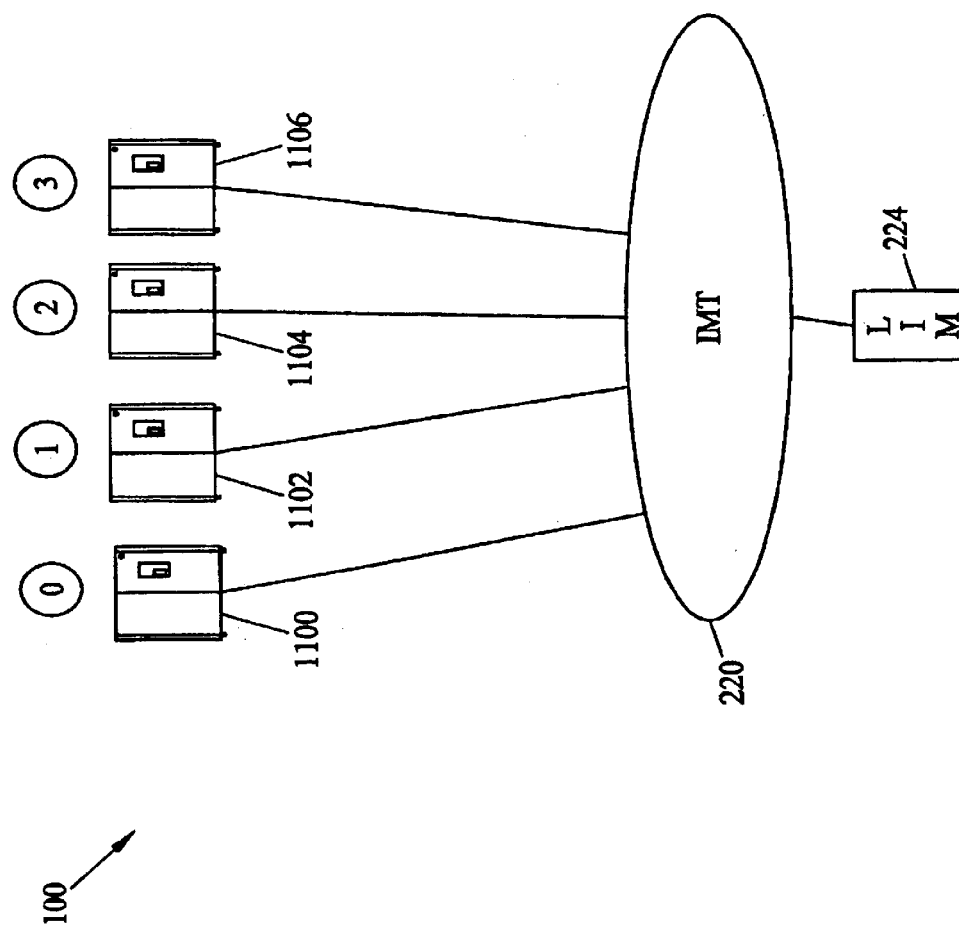
FIG. 11 is a block diagram illustrating a system for distributing messages among multiple processors for stateful and/or sequenced processing on a per sequence basis according to an embodiment of the present invention.

FIG. 11 illustrates another example of distributing messages that require stateful and/or sequenced processing on a per-sequence basis according to an embodiment of the present invention. Referring to FIG. 11, STP 100 includes LIM 224 and IMT bus 220, as described above. In addition, STP 100 includes a plurality of external application processors 1100, 1102, 1104, and 1106. Application processors 1100, 1102, 1104, and 1106 may be any suitable stand-alone computing platforms for running one or more stateful and/or sequenced call processing applications. In one embodiment of the invention, application processors 1100, 1102, 1104, and 1106 may be Tekelec Tekserver™ platforms executing ISUP call screening applications described in the above-referenced '674 Publication.

In the illustrated example, application processors 1100, 1102, 1104, and 1106 are labeled 0, 1, 2, and 3, respectively. For purposes of this example, it is assumed that ISUP call control messages are received by LIM 224 and that the offset values computed for the ISUP messages have values ranging from 0 to 31. Tables 3–5 shown below illustrate status, offset assignments, and traffic distribution for application processors 1100, 1102, 1104, and 1106.

TABLE 3

Application Processor States

| Appln. Proc. | 0 | 1 | 2 | 3 |
|---|---|---|---|---|
| Status: | A | A | A | A |

TABLE 4

Offset Assignments

| | Value | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Appln Proc. | 0 | 1 | 2 | 3 | 0 | 1 | 2 | 3 | 0 | 1 | 2 | 3 | 0 | 1 | 2 | 3 |
| | Value | | | | | | | | | | | | | | | |
| | 16 | 17 | 18 | 19 | 20 | 21 | 22 | 23 | 24 | 25 | 26 | 27 | 28 | 29 | 30 | 31 |
| Appln. Proc. | 0 | 1 | 2 | 3 | 0 | 1 | 2 | 3 | 0 | 1 | 2 | 3 | 0 | 1 | 2 | 3 |

TABLE 5

Traffic Distribution

| Appln. Proc. | 0 | 1 | 2 | 3 |
|---|---|---|---|---|
| # of messages | 8 | 8 | 8 | 8 |

In operation, when an ISUP message with a computed sequencing value of 5 is processed by LIM 224, the offset is: $5-4*(\lfloor 5/4 \rfloor)=1$. Using the offset assignments in Table 3 above, application processor 1 is chosen since the first processor from zero reading left to right is application processor 1.

In the event that application processor 1 fails, Equation 1 above is evaluated to result in an initial selection of application processor 1. Since application processor 1 is not available, Equation 2 is used to calculate the new offset. The calculation of the new offset using Equation 2 is as follows:

$$\text{Offset} = 3 - ((((\lfloor 5/4 \rfloor)*1+0) - (3*(\lfloor(\lfloor 5/4 \rfloor)*1+0)/3\rfloor)))$$
$$= 3 - 1 - 0$$
$$= 2.$$

As discussed above with regard to FIG. 10, for the failure condition, offsets are stepped off in the reverse direction from the normal case when all application processors are operational. In addition, failed application processors are not counted. Tables 6 and 7 shown below illustrate the distribution data structures used after application processor 1 fails. Table 8 illustrates the corresponding traffic distribution. In Table 6, failure offset counting starts with the first entry in the table and then proceeds backwards through the table from processor 3. Therefore, when an ISUP message with a computed sequencing value of 5 and a resulting offset value of 2 is processed by LIM 224, counting proceeds from processor 0 to processor 3, and to processor 2. Application processor 2 is available, and it is selected.

TABLE 6

Application Processor States

| Appln. Proc. | 0 | 1 | 2 | 3 |
|---|---|---|---|---|
| Status | A | N/A | A | A |

TABLE 7

Offset Assignments:

| | Value | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Appln. Proc. | 0 | 0 | 2 | 3 | 0 | 2 | 2 | 3 | 0 | 3 | 2 | 3 | 0 | 0 | 2 | 3 |
| | Value | | | | | | | | | | | | | | | |
| | 16 | 17 | 18 | 19 | 20 | 21 | 22 | 23 | 24 | 25 | 26 | 27 | 28 | 29 | 30 | 31 |
| Appln. Proc. | 0 | 2 | 2 | 3 | 0 | 3 | 2 | 3 | 0 | 0 | 2 | 3 | 0 | 2 | 2 | 3 |

TABLE 8

| | Traffic Distribution | | | |
|---|---|---|---|---|
| Appln. Proc. | 0 | 1 | 2 | 3 |
| # of messages | 11 | 0 | 11 | 10 |

If application processor 2 subsequently fails, Equation 1 is still executed yielding the original application processor 2, which is out of service. Equation 2 is then evaluated as follows:

$$\text{Offset} = 2 - ((( \lfloor 5/4 \rfloor ) * 2 + 0) - (2 * \lfloor ( \lfloor 5/4 \rfloor * 2 + 0)/2 \rfloor ))$$
$$= 2 - (2 - 2)$$
$$= 2.$$

Tables 9–11 shown below illustrate the data structures used to select an application processor when two application processors have failed. As with the failure cases discussed above, failure offset counting proceeds right to left and failed application processors are not counted. Therefore, when an ISUP message with a computed sequencing value of 5 and a failure offset of 2 is processed by LIM 224, using Table 9, application processor 3 is first looked at since it is available. Application processors 2 and 1 are skipped, since they are not available. The next offset step thus results in application processor 0, which is available. Accordingly, application processor 0 is selected.

TABLE 9

| | Application Processor Status | | | |
|---|---|---|---|---|
| Appln. Proc. | 0 | 1 | 2 | 3 |
| Status | A | N/A | N/A | A |

TABLE 10

Offset Assignments

| | Value | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| TekServer | 0 | 0 | 3 | 3 | 0 | 0 | 3 | 3 | 0 | 0 | 3 | 3 | 0 | 0 | 3 | 3 |

| | Value | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| TekServer | 0 | 0 | 3 | 3 | 0 | 0 | 3 | 3 | 0 | 0 | 3 | 3 | 0 | 0 | 3 | 3 |

TABLE 11

| | Traffic Distribution | | | |
|---|---|---|---|---|
| Appln. Proc. | 0 | 1 | 2 | 3 |
| # of messages | 16 | 0 | 0 | 16 |

Thus, as described above, the present invention includes methods and systems for distributing messages that require stateful and/or sequenced processing among multiple processors. According to the method, messages that require stateful and/or sequenced processing are identified. For each message identified as requiring and/or sequenced stateful processing, a sequence identifier is computed. Messages in the same sequence will have the same sequence identifiers, and messages in different sequences may have different sequence identifiers. The sequence value is then used to select an application processor. Because messages with different sequence identifiers result in different application processors, distribution is performed on a per sequence basis. In addition, because messages within the same sequence are sent to the same processor, exchange of state information between communication modules and/or application processors is not required.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for distributing signaling messages among multiple processors for stateful and/or sequenced processing of the signaling messages on a per sequence basis, the method comprising: in an SS7 signal transfer point or other communications network routing node:

(a) receiving a signaling message;
   (b) determining whether at least one of stateful and sequenced processing is required for the signaling message;
   (c) in response to determining that at least one of stateful and sequenced processing is required for the signaling message, computing a sequence identifier for the signaling message, the sequence identifier uniquely identifying a sequence of signaling messages to which the signaling message belongs; and
   (d) distributing the signaling message to an application processor based on the sequence identifier.

2. The method of claim 1 wherein receiving a signaling message includes receiving an SS7 signaling message.

3. The method of claim 1 wherein receiving a signaling message includes receiving a session initiation protocol (SIP) signaling message and wherein computing a sequence identifier includes computing a sequence identifier based on a session identifier in the SIP signaling message.

4. The method of claim 1 wherein receiving a signaling message includes receiving an international telecommunications union (ITU) H.225 signaling message and wherein computing a sequence identifier includes computing a sequence identifier based on a call reference value in the H.225 signaling message.

5. The method of claim 1 wherein receiving a signaling message includes receiving a stream control transmission protocol (SCTP) message and wherein computing a sequence identifier includes computing a sequence identifier based on a stream identifier in the SCTP message.

6. The method of claim 2 wherein receiving an SS7 signaling message includes receiving an ISDN user part (ISUP) signaling message and wherein computing the sequence identifier includes computing the sequence identifier based on a circuit identification code (CIC) and an originating point code (OPC) extracted from the signaling message.

7. The method of claim 2 wherein receiving an SS7 signaling message includes receiving a signaling connection control part (SCCP) class 1, 2 or 3 signaling message and wherein computing the sequence identifier includes computing the sequence identifier based on a signaling link selection (SLS) value and an originating point code (OPC) value in the received signaling message.

8. The method of claim 1 wherein receiving a signaling message includes receiving a signaling message at a signal transfer point (STP) and wherein distributing the signaling message to an application processor includes distributing the signaling message to an application processor within the signal transfer point.

9. The method of claim 1 wherein receiving a signaling message includes receiving a signaling message at a signal transfer point (STP) and wherein distributing the signaling message to an application processor includes distributing the signaling message to an application processor external to the signal transfer point.

10. The method of claim 1 wherein distributing the signaling message to an application processor based on the sequence identifier includes computing an offset based on the sequence identifier and the number of available application processors and selecting an application processor based on the offset.

11. The method of claim 10 wherein selecting an application processor based on the offset includes:

(a) computing a first offset using a first equation based on the sequence identifier and the number of available application processors;

(b) selecting a first application processor corresponding to the first offset;

(c) determining the status of the first application processor;

(d) if the first application processor is available, distributing the message to the first application processor; and (e) if the first application processor is not available, computing a second offset using a second equation, and selecting a second application processor based on the second offset, and distributing the message to the second application processor.

12. The method of claim 1 wherein distributing the signaling message to an application processor based on the sequence identifier includes distributing the signaling message to an application processor for stateful processing based on the sequence identifier.

13. The method of claim 1 wherein distributing the signaling message to an application processor based on the sequence identifier includes distributing the signaling message to an application processor for sequenced processing based on the sequence identifier.

14. The method of claim 1 wherein distributing the signaling message to an application processor based on the sequence identifier includes distributing the signaling message to an application processor for stateful, sequenced processing based on the sequence identifier.

15. The method of claim 12 wherein distributing the message to an application processor for stateful processing includes distributing the message to an application processor for SCCP class 2 or class 3 processing.

16. The method of claim 13 wherein distributing the signaling message to an application processor for sequenced processing includes distributing the message to an application processor for SCCP class 1 processing.

17. The method of claim 14 wherein distributing the message to an application processor for stateful, sequenced processing includes distributing the message to an application processor for ISUP call screening processing.

18. A system for distributing messages among multiple processors for stateful or sequenced processing of the messages on a per sequence basis, the system comprising:

an SS7 signal transfer point or other communications network routing node including:

(e) a communications module for receiving signaling messages from a signaling network;

(f) a stateful application screening and sequencing module for identifying messages requiring at least one of stateful and sequenced processing and for the messages requiring at least one of stateful and sequenced processing, for computing a sequence identifier for each message, the sequence identifier uniquely identifying a sequence of signaling messages to which the signaling message belongs, and for selecting, based on the sequence identifier, an application processor for processing the signaling message; and (g) a distribution module for distributing the signaling messages to the application processors selected by the stateful application screening and sequencing module.

19. The system of claim 18 wherein the communication module is adapted to receive SS7 signaling messages.

20. The system of claim 18 wherein the communications module is adapted to receive Internet protocol signaling messages.

21. The system of claim 18 wherein, in response to receiving an ISDN user part (ISUP) message, the stateful application screening and sequencing module is adapted to compute the sequence identifier based on the circuit identification code (CIC) and the originating point code (OPC) in the ISUP message.

22. The system of claim 18 wherein in response to receiving a class 0 signaling connection control part (SCCP) message, the stateful application screening and sequencing module is adapted to compute the sequence identifier based on a signaling link selection (SLS) code and an originating point code (OPC) in the SCCP message.

23. The system of claim 18 wherein the stateful application screening and sequencing module is adapted to compute an offset based on the sequence value and available application processors and to select an application processor from the available application processor based on the offset.

24. The system of claim 23 wherein the stateful application screening and sequencing module is adapted to compute a first offset based on the sequence identifier and to select a first application processor based on the first offset, and, in response to determining that the first application processor is not available, the stateful application screening and sequencing module is adapted to compute a second offset using a second equation and to use the second offset to select the second application processor.

25. The system of claim 18 wherein the communications module, the stateful application screening and sequencing module, and the distribution module are components of an SS7 signal transfer point (STP).

26. A computer program product comprising computer executable instructions embodied in a computer readable medium for performing steps comprising:

in an SS7 signal transfer point or other communications network routing node:
(h) receiving a signaling message;
(i) determining whether at least one of stateful and sequenced processing is required for the signaling message;
(j) in response to determining that at least one of stateful and sequenced processing is required for the signaling message, computing a sequence identifier for the signaling message, the sequence identifier uniquely identifying sequence of signaling messages to which the signaling message belongs; and
(k) distributing the signaling message to an application processor based on the sequence identifier.

27. The computer program product of claim 26 wherein receiving a signaling message includes receiving an SS7 signaling message.

28. The computer program product of claim 26 wherein receiving a signaling message includes receiving a session initiation protocol (SIP) signaling message and wherein computing a sequence identifier includes computing a sequence identifier based on a session identifier in the SIP signaling message.

29. The computer program product of claim 26 wherein receiving a signaling message includes receiving an international telecommunications union (ITU) H.225 signaling message and wherein computing a sequence identifier includes computing a sequence identifier based on a call reference value in the H.225 signaling message.

30. The computer program product of claim 26 wherein receiving a signaling message includes receiving a stream control transmission protocol (SCTP) message and wherein computing a sequence identifier include computing a sequence identifier based on a stream identifier in the SCTP message.

31. The computer program product of claim 27 wherein receiving an SS7 signaling message includes receiving an ISDN user part (ISUP) signaling message and wherein computing the sequence identifier includes computing the sequence identifier based on a circuit identification code (CIC) and an originating point code (OPC) extracted from the signaling message.

32. The computer program product of claim 27 wherein receiving an SS7 signaling message includes receiving a signaling connection control part (SCCP) class 1 signaling message and wherein computing the sequence identifier includes computing the sequence identifier based on a signaling link selection (SLS) value and an originating point-code (OPC) value in the received signaling message.

33. The computer program product of claim 26 wherein receiving a signaling message includes receiving a signaling message at a signal transfer point (STP) and wherein distributing the signaling message to an application processor includes distributing the signaling message to an application processor within the signal transfer point.

34. The computer program product of claim 26 wherein distributing the signaling message to an application processor based on the sequence identifier includes computing an offset based on the sequence identifier and the number of available application processors and selecting an application processor based on the offset.

35. The computer program product of claim 34 wherein selecting an application processor based on the offset includes:
(a) computing a first offset using a first equation based on the sequence identifier and the number of available application processors;
(b) determining a first application processor corresponding to the sequence identifier;
(c) determining the status of the first application processor;
(d) if the first application processor is available, distributing the message to the first application processor;
(e) if the first application processor is not available, computing a second offset using a second equation, selecting a second application processor based on the second offset, and distributing the signaling message to the second application processor.

36. The computer program product of claim 26 wherein distributing the signaling message to an application processor based on the sequence identifier includes distributing the signaling message to an application processor for stateful processing based on the sequence identifier.

37. The computer program product of claim 26 wherein distributing the message to an application processor based on the sequence identifier includes distributing the signaling message to an application processor for sequenced processing based on the sequence identifier.

38. The computer program product of claim 26 wherein distributing the signaling message to an application processor based on the sequence identifier includes distributing the signaling message to an application processor for stateful, sequenced processing based on the sequence identifier.

39. The computer program product of claim 36 wherein distributing the signaling message to an application processor for stateful processing includes distributing the signaling message to an application processor for SCCP class 2 or class 3 processing.

40. The computer program product of claim 37 wherein distributing the signaling message to an application processor for sequenced processing includes distributing the signaling message to an application processor for SCCP class 1 processing.

41. The computer program product of claim 38 wherein distributing the signaling message to an application processor for stateful, sequenced processing includes distributing the signaling message to an application processor for ISUP call screening.

* * * * *